INVENTORS:
RAYMOND S. BUNCH,
MYER STEPHEN BLOSSER,

BY *L. David Blumenfeld*
THEIR ATTORNEY.

United States Patent Office 3,227,942
Patented Jan. 4, 1966

3,227,942
SYSTEM WITH VOLTAGE REGULATOR HAVING INVERSE INPUT TO OUTPUT CHARACTERISTICS
Raymond S. Bunch and Meyer Stephen Blosser, Lynchburg, Va., assignors to General Electric Company, a corporation of New York
Filed Jan. 2, 1962, Ser. No. 163,419
4 Claims. (Cl. 323—22)

This invention relates to a solid state voltage regulator, and more particularly, to a voltage regulator characterized by the fact that the output voltage thereof varies inversely with the input voltage.

One well known type of solid state power supply utilizes D.C. to A.C. inverters consisting of two silicon controlled rectifiers. The controlled rectifiers alternately conduct to connect alternate halves of a transformer primary winding to the D.C. supply. The magnitude of the output voltage from such an inverter is proportional to the conducting to nonconducting time ratio of the individual controlled rectifiers. Conduction of the individual silicon controlled rectifiers is initiated by applying a suitable gating pulse of short duration, with the gating pulses being supplied by a square wave gating generator energized from the D.C. supply voltage. The repetition rate of the gate pulses is a function of the applied supply voltage, and regulation of the output voltage may be achieved by varying the gate pulse repetition rate in response to the output voltage variations. One such power supply utilizing a parallel D.C. to A.C. inverter is described and illustrated in a concurrently filed application, Serial No. 163,449, filed January 2, 1962, in the name of Elliott M. Gilbert and entitled "Regulated Power Supply," which application is assigned to the assignee of the present invention.

In addition to changes in the output voltage with changes in load conditions, any variations in the input D.C. supply voltage to the inverter also produce variations in the output. Any change in the unidirectional supply voltage changes the repetition frequency of the gate generator and hence the conducting to nonconducting time ratio of the silicon controlled rectifiers which results in a change in the output voltage. Furthermore, since the unidirectional supply voltage also provides the operating voltages for the silicon controlled rectifiers, not only is the time ratio of the output pulses from the rectifiers changed but also the amplitudes of these pulses. Merely maintaining supply voltage for the gate pulse generator constant is not enough since the increased amplitude of the output pulses from the controlled rectifiers must also be compensated for. In order to achieve this desired result, it is proposed to provide a voltage regulator circuit between the unidirectional supply voltage and the gate signal generator which regulator is characterized by the fact that its output voltage, which is in turn applied to the gate generator and controls its repetition frequency, varies inversely with variations of the supply voltage to the regulator and the controlled rectifiers.

It is therefore one object of this invention to provide a new and novel solid state regulated power supply.

Yet another object of this invention is to provide a solid state power supply including a voltage regulator having an inverse regulating characteristic.

Still another object of ths invention is to provide a new and novel solid state voltage regulator which is characterized by the fact that the voltage at its output terminals varies inversely with changes of the supply voltage at the input terminals.

Other objects and advantages of this invention will become apparent as the description thereof proceeds.

In one form of the invention, a regulator circuit is provided which includes a shunt transistor element and a series dropping resistance. Variations in the input voltage increases the bias supplied to the transistors in a direction such that the transistor conducts more heavily increasing the drop across the series resistance by a sufficient amount to reduce the voltage at regulator output terminals. This output voltage is applied to a voltage sensitive pulse gate generator to change its frequency so that the output of the power supply is maintained substantially constant.

Other objects, features and many of the advantages of this invention will be appreciated more readily by reference to the following detailed description taken in connection with the accompanying drawing in which.

Figure 1:
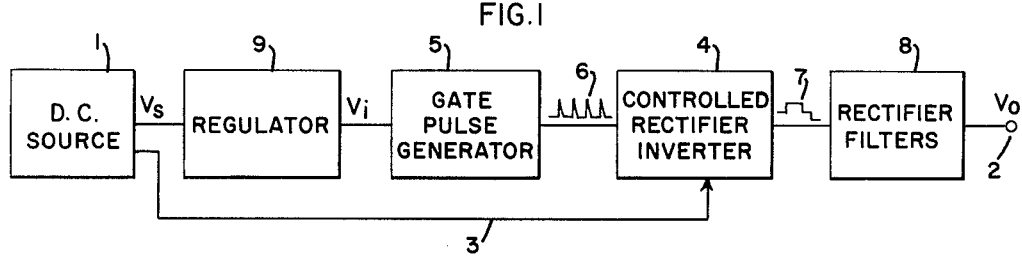
FIG. 1 shows a block diagram of a power supply utilizing a voltage regulator having the desired inverse characteristic.

FIG. 1 illustrates, in block diagram form, a power supply for converting a D.C. voltage from source 1 to a D.C. output voltage $V_O$ of a different level at output terminal and includes a silicon controlled rectifier D.C. to A.C. inverter, a rectifier circuit to convert the A.C. back to D.C., and a regulator circuit to maintain the output of the power supply constant with fluctuations of the input voltage. Unidirectional supply voltage from D.C. source 1 is connected by means of a lead 3 to an inverter circuit 4 to provide the cathode to anode operating voltage of the silicon controlled rectifiers. This operating voltage for the silicon controlled rectifiers is less than the "break-over" voltage $V_{BO}$ of silicon controlled rectifier and in the absence of a gating or triggering pulse, the controlled rectifier or rectifiers forming part of inverter 4 remain in blocking or nonconducting condition.

The supply voltage is also impressed through a regulator 9, presently to be described, on a gate pulse generator 5 which produces gating pulses 6 which periodically trigger rectifier inverter 4 into conduction. The output of inverter 4 is a square wave pulse 7 of fixed duration, which is applied to a rectifier-filter circuit 8 to produce output voltage $V_O$. The repetition rate of pulse 7 is a function of the repetition rate of the triggering pulses from gate pulse generator 5. The magnitude of the output voltage $V_O$ at terminal 2 is determined both by the ratio of rectifier conducting and nonconducting time, as well as the amplitude of the pulses 7. As pointed out above, rectifier conducting to nonconducting time ratio is controlled by the repetition rate of gating pulses 6 whereas the amplitude of the output pulses 7 is determined by the magnitude of the supply voltage from source 1. As the input voltage from source 1 fluctuates, both the amplitude of pulse 7 as well as the repetition rate of gating pulses 6 are varied, thereby controlling the output voltage $V_O$ in response to both of these effects. In order to maintain the output voltage $V_O$ at terminal 2 substantially constant in spite of variations in the unidirectional supply voltage, the repetition rate of the gating pulses 6 from gate pulse generator 5 must be varied in such a manner as to counteract the effects of amplitude changes in output pulses 7. To this end, a voltage regulator 9 is connected between the D.C. source 1 and gate pulse generator 5, which voltage regulator has operating characteristics such that the output voltage $V_I$ of the regulator, which controls the pulse repetition rate of pulse generator 5, varies inversely with fluctuations in the regulator input voltage $V_S$.

If the supply voltage from source 1 increases, the supply voltage to the controlled rectifiers of inverter 1 increases, increasing the amplitude of output pulses 7. Simultaneously the repetition rate of the gating pulses tends to increase since the pulse rate of generators varies directly with the input voltage. This increases the conducting to non-conducting time ratio. Output $V_I$ of regulator 9 must, therefore, decrease sufficiently to counteract both effects by decreasing the repetition rate of gating pulses 6 and changing the conducting to nonconducting time ratio of inverter 4 sufficiently to also counteract the effects of the increased amplitude of pulses 7. In other words, if output voltage $V_I$ were merely to remain constant with fluctuations of supply voltage from source 1, the nonconducting to conducting time ratio of the controlled rectifier inverter 4 would remain constant. However, the output voltage at terminal 2 would increase for though the on to off time ratio has been maintained, the amplitude of the square wave pulses 7 has increased due to the change in D.C. source 1. Hence, the repetition frequency of the gate pulse generators and the time ratio of the inverter 4 must be changed in the proper direction to overcome this effect. This can only be achieved by producing the desired inverse effect wherein an increase in the supply voltage from source 1 which increases the amplitude of the output pulses 7 is accompanied by a decrease in the repetition rate of gating pulses 6, thereby reducing the ratio of conducting to nonconducting time and counteracting the effect of the increased amplitude. Similarly, a decrease in the D.C. source, which reduces the amplitude of the output pulses 7 from the rectifier inverter 4, must be accompanied by an increase in the pulse repetition rate of gating pulses 6 to increase the ratio of conducting to nonconducting time of inverter.

Figure 2:
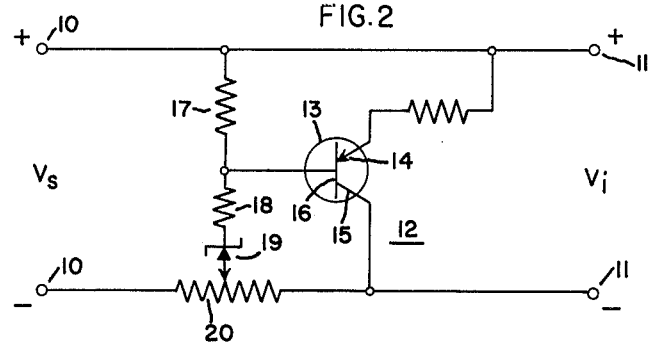
FIG. 2 is a schematic circuit diagram of the solid state voltage regulator producing the inverse characteristic.

FIG. 2 illustrates a voltage regulator having the desired inverse characteristic and which includes a shunt transistor element. The fluctuating input voltage $V_S$ from the source is impressed across regulator input terminals 10—10 with the indicated polarity to produce at output terminals 11—11 an output voltage $V_I$, having the desired inverse relationship to the input voltage. A solid state regulator circuit 12 is coupled between the input and output terminals and functions in such a manner that any increase in the input voltage $V_S$ causes a drop in the output voltage $V_I$ and any decrease in $V_S$ causes $V_I$ to increase. Regulator 12 includes a shunt P-N-P transistor 13 comprising an emitter 14 connected through emitter stabilizing resistor to the upper positive input terminal 10, a collector 15 and a base 16. Collector 15 is connected to one end of a series dropping resistor 20 connected to the lower negative input terminal. Base 12 is connected to a voltage divider connected across input terminals 10—10 consisting of a stabilizing resistance 17, a current limiting resistance 18 and a voltage reference source such as the Zener diode 19. Zener diode 19 is connected to a tap on series dropping resistance 20 and in conjunction with current limiting resistance 18 maintains the voltage at base 16 constant at a value established by the reverse breakdown voltage of the Zener diode.

Any increase or decrease in the input voltage at terminals 10—10 is, therefore, manifested as a change in the base-emitter voltage of the transistor since the base is held constant by the Zener. Thus, if the input voltage increases, emitter 14 instantaneously becomes more positive relative to base 16 increasing the base-emitter voltage and causing more collector current to flow. The increased collector current flows through series dropping resistor 20 and increases the voltage drop by an amount sufficient to reduce the output voltage at terminals 11—11 below its previous value. The incremental drop at the output terminals 11—11 is proportional to the increase in the voltage drop across that portion of dropping resistor 20 connected between collector 15 and Zener diode 19.

The increase in the voltage drop between the collector and the point of connection to the Zener diode is reflected as a base to emitter voltage change which establishes a new collector current level so that the output voltage $V_I$ is reduced correspondingly. The ratio of resistance between Zener diode 19 and negative output terminal 10 and collector 15 controls the magnitude of the inverse characteristic. The larger the ratio the smaller the incremental change at output terminals and the smaller the ratio the greater the increment of change at the output terminals. By selecting the ratio of these resistances, the slope of the inverse characteristic may be controlled.

Thus, the circuit in effect "over-regulates" by a given amount to produce the desired inverse characteristic. That is, a regulator as normally understood merely maintains the output voltage constant with variations in the input voltage. The instant circuit thus "over-regulates" in the sense that it goes beyond merely maintaining the output voltage constant, but actually varies it in the opposite direction, thus establishing the desired inverse characteristic.

One example of such a regulator circuit was constructed with the following exemplary component values:

$R_{17} = 270 \Omega$
$R_{18} = 270 \Omega$
$R_{20} = 370 \Omega$

The resistance between terminal 10 and Zener diode $19 = 320 \Omega$;

The resistance between collector 15 and Zener diode = $50 \Omega$ $$\text{The ratio } \frac{R_{10\text{-}19}}{R_{19\text{-}15}} = 6.4$$

Zener Diode 19: IN 1313, Hoffman Electronics Co.
Transistor 13: TN 1263, PNP Transistor—Minneapolis Honeywell Co.

A series of tests were carried out utilizing such a regulator. The input voltage $V_S$ was varied over a range of 50% and the output voltage $V_I$ measured. The following compilation represents the results of these tests:

| $V_S$ | $V_I$ |
|---|---|
| 86 volts | 4.20 |
| 7? | 4.20 |
| 57 | 4.31 |

It is obvious from this tabulation that with a 33.7% decrease in the input voltage, a 5.5% increase in the output voltage was achieved and that the desired inverse output to input regulator characteristic was achieved. The degree of the inverse characteristics, i.e., the slope of the $V_S$ vs. $V_I$ curve, may be varied, as pointed out heretofore, by varying the ratio of the resistances between the input terminal and the Zener and the collector and the Zener.

Figure 3:
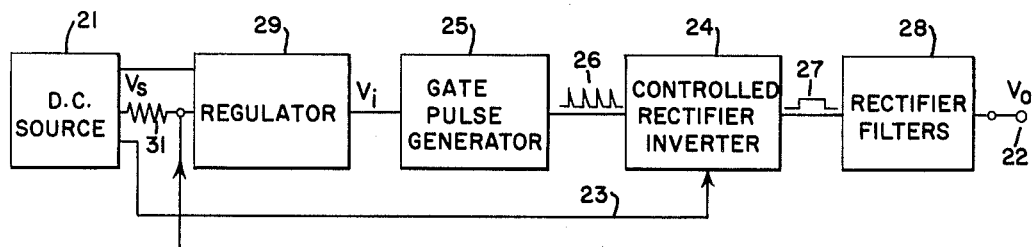
FIG. 3 is an alternative embodiment, shown in block diagram form, of the power supply.

FIG. 3 illustrates an alternative embodiment of the power supply, in block diagram form, wherein a portion of the output voltage $V_0$ from the power supply output terminal 22 is fed back to the input of the regulator. Supply voltage from D.C. source 21 is connected by means of a lead 23 to an inverter circuit 24 to provide cathode to anode operating voltage for one or more silicon controlled rectifiers making up inverter 24.

The D.C. supply voltage is also applied, through a regulator 29, on a gate pulse generator 25 which produces gating pulses 26 to trigger the controlled rectifiers of inverter 24 into conduction. The output of inverter 24 is a square wave pulse 27 of fixed duration which is applied to rectifier-filter circuit 28 to produce a unidirectional output voltage $V_0$ at terminal 22. The repetition rate of pulse 7 is a function of the gating pulse rate. The magnitude of the output voltage $V_0$ at terminal 22 is, as pointed out in connection with the circuit of FIG. 1, determined both by the conducting to non-conducting time ratio of the rectifiers as well as the amplitude of pulse 27.

In order to maintain the output voltage $V_0$ constant with changes both in the input voltage and changes in load conditions, a voltage regulator 9 is provided which has inverse input to output characteristic and a portion of the output voltage is fed back over line 30 to the regulator. The voltage regulator produces a regulator output voltage $V_I$, which varies inversely with the input voltage $V_S$. A series dropping resistor 31 is connected between the source 21 and regulator 29. A fractional part of the suply voltage is dropped at resistance 31 to provide the input voltage to the regulator thereby to control gate pulse generator 25. Since the feedback voltage from output terminal 22 is also applied to the input of regulator 29, the output regulator voltage $V_I$, also varies to control the gating pulse generator in response to changes in output voltage $V_0$ occasioned by changes in load conditions rather than in the supply voltage.

While particular embodiments of this invention have been shown, it will, of course, be understood that it is not limited thereto since may modifications both in the circuits and in the instrumentalities employed may be made. It is contemplated by the appended claims to cover any such modifications as fall within the true spirit and scope of the invention.

What is claimed as new and desired to be secured by Letters Patent is:

1. In a regulated power supply for maintaining the output of said supply constant with variations in the input supply voltage the combination comprising a D.C. to A.C. inverter including
    (a) a controlled rectifier of the self-commutating type for producing a square wave output pulse the duration of which is substantially constant during its conducting interval, the conducting to nonconducting time relationship of said rectifier being variable,
    (b) pulse generating means for generating triggering pulses for said controlled rectifier inverter to initiate conduction, the repetition rate of said pulses varying with the operating voltage thereto to change the ratio of conducting to nonconducting time,
    (c) input terminals adapted to have a fluctuating unidirectional supply voltage impressed thereon,
    (d) means coupling said terminals to said inverter to provide operating potential for said controlled rectifier, and
    (e) voltage regulator means coupled between said terminals and said pulse generator, said voltage regulator having an inverse input to output characteristics so that the regulator unidirectional output voltage increases with decreasing supply voltage and decreases with increasing supply voltage whereby the pulse repetition rate of said generator is varied to change the conducting to nonconducting time ratio of said rectifier and maintain the output of said supply constant with variations in said input supply.

2. In a voltage regulator having an inverse input to output characteristic the combination comprising,
    (a) a pair of input terminals having a fluctuating unidirectional supply voltage impressed thereon,
    (b) a pair of output terminals,
    (c) a resistor connected in series between one of said input and one of said output terminals, and
    (d) a regulating transistor connected in shunt with said input and said output terminals, one electrode of said transistor being coupled to one of said input and output terminals, another of said electrodes being connected to the remaining input and output terminals, the remaining electrode being connected to an intermediate point on said resistor through a voltage reference source whereby any change in input voltage changes the current through said transistor and said series resistor thereby establishing a different voltage reference point to which said voltage reference source and said third electrode is connected whereby the output voltage varies inversely with changes in input voltage.

3. The regulator according to claim 2 wherein said voltage reference source includes a Zener diode.

4. In a voltage regulator having an inverse input to output characteristic the combination comprising,
    (a) a pair of input terminals adapted to have a fluctuating unidirectional supply voltage impressed thereon,
    (b) a pair of output terminals,
    (c) a resistor connected in series between one input and one output treminal,
    (d) a shunt transistor having emitter, base, and collector electrodes, said emitter being connected to the other of said input and output terminals, said collector being connected between said resistor and said one output terminal, and
    (e) a voltage reference source connected between said base electrode and an intermediate point on said resistor to thereby establish a variable voltage reference point for said reference source and base electrode whereby changes in the input supply voltage produces an inverse effect in the output voltage from said regulator.

References Cited by the Examiner

UNITED STATES PATENTS

| | | | |
|---|---|---|---|
| 2,841,757 | 7/1958 | Shields | 323—22 |
| 2,948,843 | 8/1960 | Klein | 323—81 |
| 2,987,681 | 6/1961 | Buck | 323—22 |
| 2,992,382 | 7/1961 | Hetzler et al. | 323—22 |
| 3,021,470 | 2/1962 | Lawrence | 321—16 |
| 3,046,418 | 7/1962 | Eachus | 307—88.5 |
| 3,047,789 | 7/1962 | Lowry | 323—22 |
| 3,061,770 | 10/1962 | Steinitz | 323—81 |
| 3,074,000 | 1/1963 | Salihi | 321—16 |
| 3,076,925 | 2/1963 | Jackson | 321—16 |

LLOYD McCOLLUM, *Primary Examiner.*

G. H. GERSTMAN, D. L. RAE, K. D. MOORE,
*Assistant Examiners.*